June 10, 1941.  H. M. SCHMITT  2,244,732
MEASURING APPARATUS
Filed Jan. 13, 1938   2 Sheets-Sheet 2

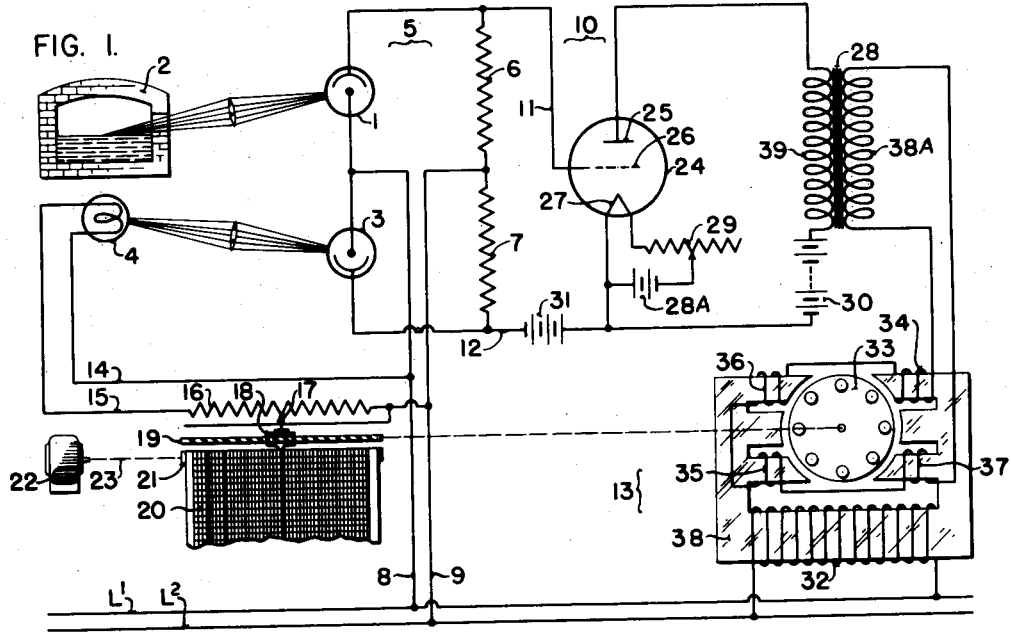
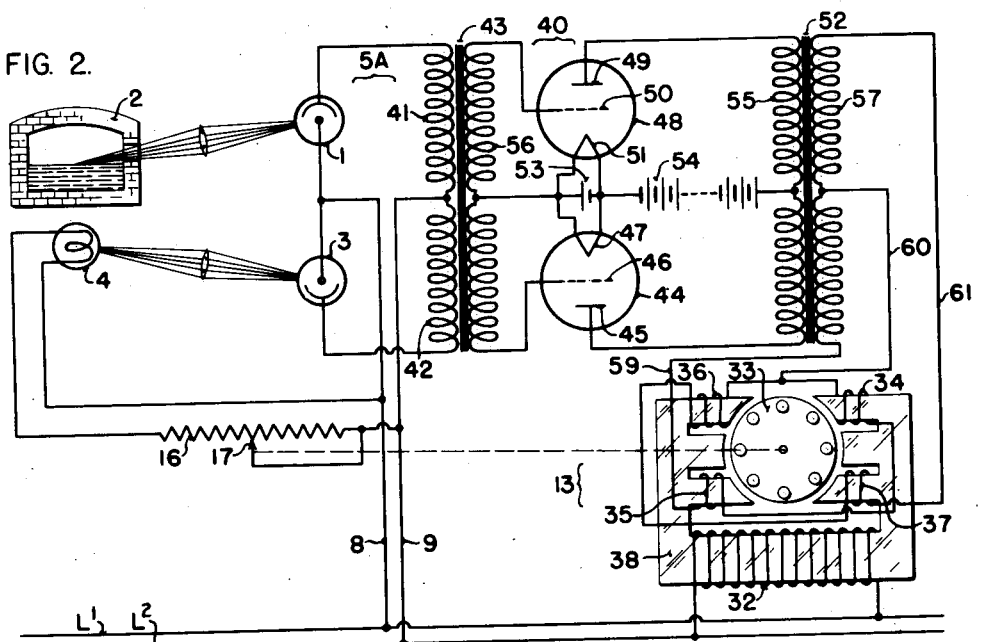

INVENTOR.
HENRY M. SCHMITT
BY George M. Wenchauf
ATTORNEY.

Patented June 10, 1941

2,244,732

UNITED STATES PATENT OFFICE 2,244,732

MEASURING APPARATUS

Henry M. Schmitt, Philadelphia, Pa., assignor to The Brown Instrument Company, Philadelphia, Pa., a corporation of Pennsylvania Application January 13, 1938, Serial No. 184,907

14 Claims. (Cl. 88—23)

The present invention relates to apparatus for ascertaining and continuously recording the magnitude of a variable condition, and more particularly the invention relates to self balancing measuring apparatus which is of special utility in recording and/or controlling temperature variations in incandescent bodies.

An object of the invention is to provide radiant-energy responsive apparatus for ascertaining and continuously recording and/or controlling temperature variations in incandescent bodies.

Another object of the invention is to provide apparatus of the type referred to above, which is characterized by being extremely fast in response and self balancing.

A special object of the invention is to provide high speed temperature measuring and recording apparatus in which a light sensitive device may be employed as the condition responsive element, and in which delicate electrical current measuring instruments, such, for example, as microammeters or milliammeters, are not required nor employed.

In measuring and recording temperature variations in incandescent bodies it is relatively important in certain applications that the apparatus employed be capable of responding to and recording the variations in a minimum of time. For example, if an accurate record is desired of the variations in temperature throughout their length of successive pieces of material such as bars or billets passing in process through a steel mill, it is of especial importance that the measuring apparatus be capable of a high speed of response. The practicability of employing light sensitive devices or photoelectric cells in making such measurements is readily apparent, since, as is well known, photoelectric cells are characterized by their extreme rapidity of response to variations in light intensity and pass an electric current which bears a definite relation to the temperature of the body from which the light emanates.

Various high speed radiant energy responsive systems utilizing a light sensitive device as the condition-responsive element have heretofore been proposed for measuring and recording temperature variations in incandescent bodies, but all of the proposed systems have been of a deflectional type employing a delicate electrical current measuring instrument and a scale or chart with which the deflecting member or pointer of the instrument is adapted to cooperate. In the proposed systems the radiant light from an incandescent body is ordinarily directed on a photoelectric cell and the electric current passed by the cell is measured by a suitably calibrated electrical current measuring instrument. In some instances, the current passed by the photoelectric cell is first amplified by some form of electronic amplifier and the amplified quantity is measured by a similarly calibrated electrical current measuring instrument. As is apparent the position of the deflecting member or pointer of the instrument relative to the scale thereof will provide a measure of the temperature of the incandescent body, and, if a record is desired, suitable apparatus may be arranged in cooperative relation with the instrument pointer to periodically record its position on a chart or a pen may be mounted directly on the instrument pointer and arranged to cooperate with a chart to thereby provide a continuous record of the temperature variations. Since the only time lag in recording by the last mentioned method is that required for the instrument pointer to swing up scale, this method has proved to be the most desirable of the prior art devices adapted for utilizing to advantage the high speed of response of the light sensitive elements.

As is well known, however, deflectional measuring instruments are undesirable in many respects for making precision measurements. For example, the calibration of a deflectional measuring instrument is dependent upon the constancy of magnets, springs, jewel bearings, and the level of the instrument, all of which are affected and changed to varying extents by many factors such, for example, as temperature, age, and vibration. Such instruments, furthermore, are limited in respect to the available torque for recording or controlling purposes making necessary the use of narrow and therefore undesirable charts and unsatisfactory control instrumentalities. Such instruments, furthermore, embody charts having non-rectangular coordinates which are undesirable and ordinarily the periodicity of response necessarily employed results in sluggish response thereof to small departures.

The above objections have been avoided in the apparatus of my invention by providing a self balancing electrical bridge network including a photoelectric cell in one arm which is responsive to the radiant light emanating from an incandescent body whose temperature is to be measured. The photoelectric cell operates to control the bridge network balance and a reversible electrical motor is arranged to be selectively controlled in response to bridge network unbalance so that the motor will remain stationary or will be energized for rotation in one direction or the other as the temperature of the incandescent body rises above or falls below a predetermined level. Suitable apparatus under control of the motor is provided for rebalancing the bridge network whereby energization of the motor is employed to effect rebalancing of the bridge.

In one embodiment of my invention such rebalancing apparatus may take the form of a photoelectric cell connected in another arm of the bridge network and an associated electric lamp provided for illuminating this photoelectric cell. A rheostat is provided for varying the supply of energizing current to the lamp until the illumination of the second mentioned photoelectric cell is equal to that of the first mentioned photoelectric cell and the motor shaft is connected in any convenient manner to the adjustable contact of the rheostat so that energization of the motor is employed to effect movement of the rheostat contact in the proper direction to equalize the illumination on the two photoelectric cells. As will be readily apparent, the new position of the rheostat rebalancing contact will provide a measure of the temperature of the incandescent body and, if desired, a pen may be arranged to cooperate with a suitably calibrated record chart for recording the temperature variations.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Fig. 1 is a diagrammatic view illustrating one embodiment of the invention as adapted for use in measuring and recording the temperature of an incandescent body;

Fig. 2 illustrates a modification of the arrangement disclosed in Fig. 1;

Figure 3:
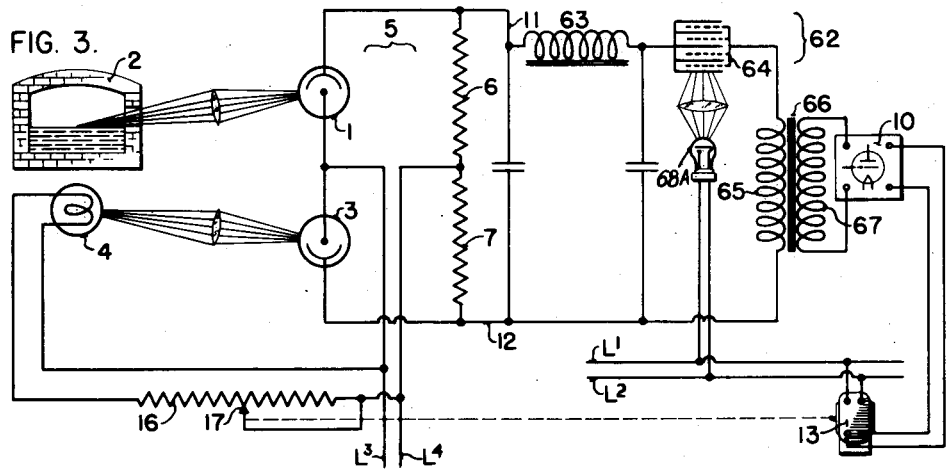
Figs. 3–7 illustrate further modifications of the arrangement of Fig. 1.

In Fig. 1 of the drawings, a photoelectric pyrometer is illustrated in which a photoelectric cell 1 is arranged to receive light from the interior of a furnace 2, and a second photoelectric cell 3 is arranged to receive light from a lamp 4, the illumination of which is adapted to be controlled by means responsive to the relative illuminations of the two photoelectric cells. The photoelectric cells are arranged in a Wheatstone bridge network 5, and, as the temperature of the incandescent material within the furnace varies thereby changing the illumination of the photoelectric cell 1 and unbalancing the bridge network, the illumination of lamp 4 is varied by adjustment of the supply of energizing current thereto until the illumination on the two photoelectric cells is again balanced. As will be clear, the magnitude of the lamp energizing current will then be a measure of the temperature of the incandescent material in the furnace 2.

The bridge network 5 includes resistors 6 and 7 in its remaining arms and receives energizing current from alternating current supply conductors $L^1$ and $L^2$ through conductors 8 and 9. Conductor 8 is connected to one bridge energizing terminal shown as the point of connection of the anodes of photoelectric cells 1 and 3, and conductor 9 is connected to the other bridge energizing terminal shown as the point of connection of resistors 6 and 7.

Unbalance of the bridge network 5 is detected by an electronic amplifier 10, the input terminals of which are connected by conductors 11 and 12 to the equalizing terminals of the bridge network, and, as illustrated, the illumination of lamp 4 is adapted to be varied for bridge rebalancing purposes by an arrangement including a reversible electrical motor 13 which may advantageously be selectively energized for rotation in one direction or the other by the amplifier 10.

The arrangement referred to above also includes an adjustable current limiting resistance 16 inserted in series with the conductors 14 and 15 which supply energizing current to the lamp 4. A contact 17 adapted to vary the amount of resistance 16 in circuit is attached to a suitable carrier 18 which is capable of being moved along the length of the resistance 16. For this purpose the carrier 18 may be in the form of an internally threaded nut adapted to ride on a screw threaded shaft 19 and arranged to be moved in one direction or the other when the shaft is rotated. The shaft of motor 13 is connected in any convenient manner to the shaft 19 so that as the motor 13 is selectively controlled for rotation by the amplifier 10, the shaft 19 will be rotated at the desired speed and in the desired direction to vary the position of the contact 17 and thereby the amount of the current limiting resistance 16 in circuit with the lamp 4. Thus, on a change in the illumination of photoelectric cell 1, the bridge network 5 will be unbalanced in a corresponding direction, resulting in selective energization of the motor 13 for rotation in the proper direction to effect adjustment of the supply of energizing current to lamp 4 to a new value such that the illumination on the two photoelectric cells will be again balanced.

Desirably, a pen may be mounted on the carrier 18 and arranged in cooperative relation with a recorder chart 20 for recording the variations in temperature of the material in the furnace 2. The recorder chart is arranged to be driven by a continuously rotating roller 21 and the latter is driven in any convenient manner, as, for example, by a unidirectional motor 22 through suitable gearing 23 so that a record of the temperature of the material in the furnace 2 will be had as a continuous line on the chart.

As illustrated the amplifier 10 includes a filament type triode 24 and an output transformer 28. The triode 24 includes an anode 25, a control grid 26, and a filament cathode 27 which may be energized from any suitable alternating current or direct current supply source, as desired, and, as shown, receives energizing current from a battery 28A through a current limiting resistance 29 which is adjustable for varying the energizing current supplied the filament to a desirable value.

Anode voltage is supplied the valve 24 from a battery 30, but it will be understood the output of a suitable rectifier energized from an alternating current source may be employed in lieu of the battery 30. Bias voltage is supplied the control grid 26 of valve 24 by a battery 31 and operates to normally maintain the current flow through the valve at a predetermined mean value.

As illustrated, the motor 13 may be of the shading pole variety having a main field winding 32 energized directly from the alternating current supply conductors L¹ and L², a squirrel cage armature 33, shading field windings 34, 35, 36 and 37, and a field core 38 common to all the field windings. The shading field windings are adapted to be energized by the amplifier output current and as shown are connected in series with the secondary winding 38A of transformer 28, the primary winding 39 of which is connected in the output circuit of valve 24, and as will be apparent the motor will be selectively controlled for rotation in one direction or the other depending upon whether the amplifier output current is in phase with or 180° out of phase with the voltage of the supply conductors L¹ and L².

The motor main field winding 32 is energized directly from the alternating current supply conductors L¹ and L², but is of such high inductance that the current therethrough lags the voltage of the supply conductors by approximately 90°. The controlling voltage impressed on the input circuit of amplifier 10 by the bridge network 5 is substantially in phase with or 180° out of phase with the line voltage, and since the phase shift in the amplifier 10 is negligible, the voltage applied to the motor shading field windings is of approximately corresponding phase. The shading field windings are so designed that their inductance is considerably less than that of the main field winding whereby the current through these windings is more nearly in phase with the applied voltage. Thus, the magnetomotive forces set up by the main field winding and the shading field windings are displaced by an angle approaching 90° but not exceeding that value whereby the motor 13 is energized for rotation in one direction or the other as the voltage applied to the shading field windings is selectively controlled as to phase, and as will be clear, the degree of energization of motor 13 is dependent upon the magnitude of the current supplied the shading field windings. That is to say, the phase relation of the amplifier output will depend upon the direction of unbalance of the bridge network 5 while the magnitude of the amplifier output current will depend upon the extent of bridge unbalance.

In Fig. 2 I have illustrated, more or less diagrammatically, a modification of the arrangement disclosed in Fig. 1 in which the bridge network 5 has been replaced by a bridge network 5A adapted to be energized through conductors 8 and 9 from the supply conductors L¹ and L², and an electronic amplifier 40 is employed in lieu of amplifier 10. It will be noted the bridge network 5A includes photoelectric cells 1 and 3 in two opposed arms and opposite halves 41 and 42 of the primary winding of a transformer 43 in its remaining arms. As illustrated, the amplifier 40 includes a pair of electronic valves 44 and 48 which are filament type triodes and may be contained in the same envelope, if desired, and also includes an output transformer 52. The valve 44 includes an anode 45, a control grid 46, and a filament cathode 47, and the valve 48 includes an anode 49, a control grid 50, and a filament cathode 51. The filament cathodes 47 and 51 are connected in parallel and as shown receive energizing current from a suitable battery 53. If desired, a current limiting resistor 29 may be provided, as in the arrangement of Fig. 1, for adjusting the value of the energizing current supplied the filament cathodes.

Anode voltage is supplied the valves 44 and 48 from a battery 54, the negative terminal of which is connected to the cathodes 47 and 51, which are connected together, and the positive terminal thereof is connected to a center tap on the primary winding 55 of transformer 52. One end of the primary winding is connected to the anode 45 of valve 44, and the other end of the primary winding is connected to the anode 49 of valve 48. As shown, the terminals of the secondary winding 56 of transformer 43 are connected to the input circuit of amplifier 40. Specifically, a center tap on the winding 56 is connected to the filament cathodes 47 and 51 of valves 44 and 48, one end of the winding is connected to the control grid 46 of valve 44, and the other end of the winding is connected to the control grid 50 of valve 48.

In operation, when the illumination on the two photoelectric cells 1 and 3 is balanced, the current flow through the photoelectric cell 1 will be identical with that through the photoelectric cell 3 whereby the opposite halves 41 and 42 of the primary winding of transformer 43 will be equally energized. The magneto-motive force induced in the transformer 43 by the winding 41 will be in the opposite direction from that induced therein by the winding 42 so that these magnetomotive forces will cancel each other and zero voltage will be induced in the transformer secondary winding 56. When the temperature of the incandescent material within the furnace 2 changes, however, the illumination on the photoelectric cell 1 will be changed to a corresponding extent to thereby unbalance the bridge network 5A. Thereupon, the energizing current flow through the winding 41 will be rendered different from that through the winding 42 and the magnetomotive forces induced in the transformer 43 by these windings will not be equal and opposite and cancel out whereby an alternating voltage will be induced in the secondary winding 56. As will be clear, the phase of this induced voltage will be directly dependent upon the direction of unbalance and the magnitude thereof will be proportional to the extent of bridge unbalance.

The alternating voltage induced in the transformer secondary winding 56 is impressed on the input circuit of amplifier 40 and as a result the potentials of the control grids 46 and 50 are swung in opposite phase at a frequency equal to the supply line frequency so that the valves 44 and 48 are alternately rendered more conductive and less conductive, one valve being rendered more conductive while the other valve is being rendered less conductive. The resulting pulsating current flows through the transformer primary winding 55 in successively opposite directions through the opposite halves of the primary winding result in the induction of an alternating voltage of line frequency in the secondary winding 57 of transformer 52 whose phase and amplitude are determined by the direction and magnitude of the unbalanced current flows through the secondary winding 56 of transformer 43.

The terminals of the transformer secondary winding 57 are connected to the terminals of the shading field windings of a motor 13, which motor may be of the type described in connection with Fig. 1. While the shading field windings may be connected in series relation with the transformer winding 57 in a manner similar to that shown in the Fig. 1 arrangement, in the disclosure of Fig. 2 I have illustrated a modification of this connection in which diametrically opposed shading field windings 34 and 35 are connected in series relation by conductors 59 and 60 with one half of the transformer secondary winding 57, and diametrically opposed shading field windings 36 and 37 are connected in series relation with the other half of the secondary winding 57 by conductors 60 and 61, the conductor 60 being common to both sets of shading fields.

The shading field windings are so wound on their respective shading field poles that energization of the shading field windings by currents in phase with the supply line voltage will energize the motor for rotation in one direction and energization of these windings by currents displaced 180° in phase from the supply line voltage will energize the motor for rotation in the opposite direction. Thus depending upon the direction of unbalance of the bridge network 5A the motor will be energized for rotation in a corresponding direction and in this arrangement, as in the Fig. 1 arrangement, may effect an adjustment of the amount of resistance 16 in circuit with the lamp 4 to thereby balance the illumination on the two photoelectric cells.

In Fig. 3 I have illustrated a further modification of the arrangement disclosed in Fig. 1 in which the bridge network 5 is energized from direct current supply conductors $L^3$ and $L^4$ and in which a converter 62, to be described, is provided for transforming the bridge direct current unbalanced voltages into corresponding pulsating direct current voltage which may be readily amplified. In this arrangement it will be noted a filter 63 is connected in the conductors 11 and 12 between the bridge network 5 and the converter 62. When all of the bridge components are located at a point remote from the converter 62 and the amplifier 10, undesirable and unstable effects may be produced due to the induction of stray alternating voltages in the supply conductors 11 and 12 from adjacent alternating voltage power supply lines, for example. By locating the filter 63 close to the converter 62 and amplifier 10, these stray alternating voltages may be prevented from entering the amplifier 10 and are thus rendered harmless. The filter 63 is preferably so designed as to be most effective in stopping the passage of stray voltages having the same frequency as those which it is desired to amplify in the amplifier 10, and, as illustrated, may consist of a parallel arrangement of suitable condensers and choke coils.

As illustrated, the converter 62 referred to above includes a selenium cell 64 which is subjected to a light source of varying intensity and through which the bridge unbalanced currents are passed. It is characteristic of a selenium cell to vary in electrical resistance in accordance with the amount of light transmitted to it so that when the cell is subjected to regular flashes of light, the current flow conducted thereby will be intermittent. This pulsating current is impressed on the primary winding 65 of a transformer 66, and causes the induction of an alternating voltage of corresponding phase and magnitude in the secondary winding 67 which may be readily amplified by the amplifier 10, and as shown the terminals of the secondary winding 67 are connected to the input circuit of the amplifier 10.

The variable source of light referred to may advantageously take the form of a neon lamp 68A having its terminals connected to the alternating current supply conductors $L^1$ and $L^2$ so that the lamp emits light varying in intensity as the current supplied by the conductors $L^1$ and $L^2$ varies in direction and magnitude. Desirably one electrode of the lamp 68A is shielded from the selenium cell 64 so that a flash of light will be received by the latter only during one-half of each complete cycle of the alternating current supplied by the conductors $L^1$ and $L^2$. One electrode of lamp 68A may be in the form of a relatively small plate and the other electrode in the form of a larger plate disposed between the smaller plate and the selenium cell 64 so that the larger plate completely shields the smaller plate from the cell 64, and the latter will thereby be responsive to the source 68A during only one-half of each cycle. The purpose of so shielding one electrode of the lamp 68A is to permit selective energization of reversible motor 13 when the lamp 68A is energized from the same source of alternating voltage as the motor main field winding 32. As shown, a suitable converging lens may be interposed between the lamp 68A and the selenium cell 64, if desired.

Thus, on a change in the temperature of the incandescent material in the furnace 2 resulting in a change in the illumination of photoelectric cell 1, the bridge network 5 will be unbalanced in a corresponding direction. The flow of direct bridge unbalanced currents through the selenium cell 64 will be transformed into pulsating currents of regular frequency which may be readily amplified by the amplifier 10 and the amplified currents are impressed on the shading field windings of motor 13, as described in connection with Fig. 1, for controlling the selective energization of the motor. In this arrangement as well as in the previous arrangements, the motor 13 may be employed to effect an adjustment of the amount of resistance 16 in circuit with the lamp 4 for rebalancing the illumination on the two photoelectric cells.

Figures 4, 7:
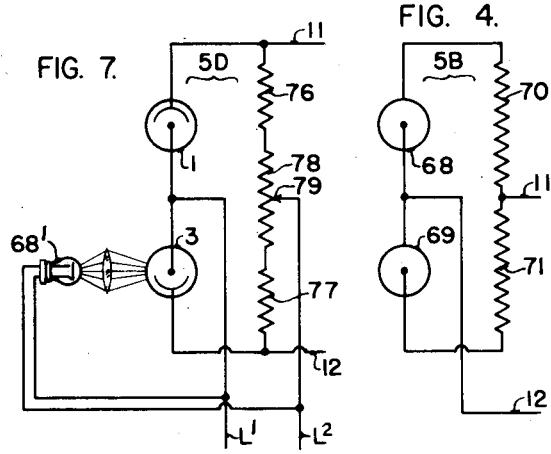

In Fig. 4 I have illustrated, more or less diagrammatically, a modification of the disclosure of Fig. 3 in which a bridge network 5B including photovoltaic cells 68 and 69 in two opposed arms is employed in lieu of the bridge network 5. The remaining arms of the network are comprised of resistances 70 and 71. Suitable photovoltaic cells for use according to this arrangement are Weston "Photronic" cells which are characterized by their ability to transform radiant energy into electrical energy without the use of any auxiliary power source such as the supply conductors $L^3$ and $L^4$ for example. Such a power supply source may, therefore, be dispensed with in this arrangement. In this arrangement the photovoltaic cell 68 is arranged to receive energy from the interior of furnace 2, and the cell 69 is arranged to receive light from a lamp 4 which may desirably receive energizing current from the supply conductors $L^1$ and $L^2$. For purposes of rebalancing the bridge network 5B on a change in the illumination on the photovoltaic cell 68, a suitable current limiting resistor 16 is preferably employed for varying the supply of energizing current to lamp 4, and the amount of resistor 16 in circuit may desirably be controlled by a motor 13 as disclosed in Fig. 1.

Figure 5:
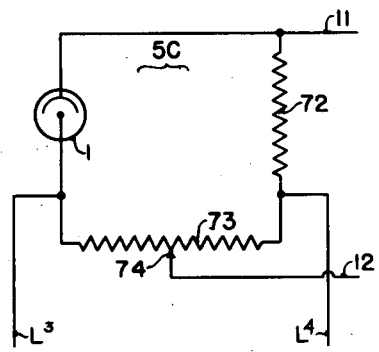

In Fig. 5 I have illustrated, more or less diagrammatically, a further modification of the disclosure of Fig. 3 in which a bridge network 5C adapted to receive energizing current from the supply conductors $L^3$ and $L^4$ is employed in lieu of the bridge network 5. In this arrangement it will be noted a photoelectric cell 3 is not employed, thereby permitting the lamp 4 also to be dispensed with. As illustrated, the bridge network 5C includes the photo-electric cell 1 in one arm, a fixed resistance 72 in an adjacent arm, and a slidewire resistance 73 as the remaining arms. The supply conductor L³ is connected to the point of engagement of the anode of photoelectric cell 1 and one end of slidewire resistance 73 and the supply conductor L⁴ is connected to the point of engagement of the resistance 72 and the other end of slidewire resistance 73. One bridge equalizing or balancing terminal is the point of engagement of the cathode of photoelectric cell 1 and the other end of resistor 72 and it will be noted the remaining bridge equalizing terminal is the point of engagement of a movable contact 74 with the slidewire resistance 73. As in the disclosure of Fig. 3, the bridge equalizing terminals are connected by conductors 11 and 12 to the terminals of a suitable filter 63 and therethrough to the terminals of a converter 62.

Thus, on a change in the illumination of photoelectric cell 1, the bridge network 5C will be unbalanced accordingly and the unbalanced direct currents are transformed into corresponding pulsating currents which are amplified by the amplifier 10. The amplified currents are employed to control the energization of motor 13 and the latter may desirably be employed to adjust the contact 74 to a new position along the slidewire resistor 73 at which the unbalanced voltage impressed on the conductors 11 and 12 is reduced to a zero value.

Figure 6:
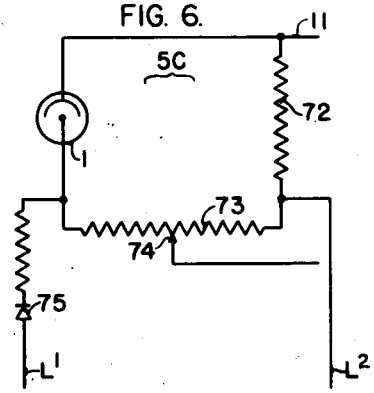

In Fig. 6, I have illustrated, more or less diagrammatically, a further modification of the Fig. 3 arrangement in which the converter 62 may be dispensed with and a single photoelectric cell employed in measuring the temperature of the interior of furnace 2. With this arrangement the bridge network 5C is arranged to be energized from the supply conductors L¹ and L² through a suitable rectifier device 75 which may conveniently be a copper oxide rectifier. The rectifier 75 is adapted to pass current in one direction only whereby the bridge network will be energized by pulsating direct current. It is noted that a photoelectric cell is also adapted to conduct current in one direction only, and therefore, the photoelectric cell 1 must necessarily be so connected in the bridge network that its anode is rendered positive during the half cycle when the rectifier 75 is conductive.

It will be clear that with a predetermined value of illumination of photoelectric cell 1 the bridge network 5C will be balanced with contact 74 at a corresponding position along the slidewire resistor 73, and on a change in one direction or the other in the illumination of photoelectric cell 1, the bridge network 5C will be unbalanced to a corresponding extent. The bridge unbalanced electromotive forces may be impressed on the input circuit of amplifier 10 and the latter employed as described in connection with Fig. 1 for selectively controlling the operation of motor 13 and thereby the adjustment of contact 74 along resistor 73 for rebalancing the bridge network.

In Fig. 7 I have illustrated, more or less diagrammatically, a further modification of the arrangement of Fig. 1. As illustrated, in this arrangement two arms of a bridge network 5D are comprised of photoelectric cells 1 and 3, and the remaining two arms are comprised of resistances 76, 77 and 78 more or less of the latter resistance being adapted to be included in the network arm including resistance 76 or 77 as a contact 79, adjustable along resistance 78, is moved back and forth along the resistance. Energizing voltage is supplied the bridge network from the alternating supply conductors L¹ and L².

With this arrangement the photoelectric cell 1 is adapted to be exposed to light from a furnace the temperature of which is being measured, and the photoelectric cell 3 is subjected to light from one plate of a neon lamp 68¹. The plate to which the cell 3 is exposed is arranged to be illuminated during the half cycle of the supply conductors L¹ and L² when the anodes of photoelectric cells 1 and 3 are positive with respect to the cathodes thereof. Thus, it will be noted that during the half cycle when the cells 1 and 3 are conductive the intensity of illumination of the interior of the furnace 2 will be compared to that of the plate of neon tube 68¹, and it will be clear that if the illuminations are equal no current will flow in the bridge equalizing conductors 11 and 12, but if the furnace illumination is less than or greater than the neon plate illumination, pulsating current in phase with the voltage of the alternating supply conductors, or 180° out of phase therewith, will flow in the equalizing conductors 11 and 12. This unbalanced current may be amplified by the amplifier 10 of Fig. 1 or any other suitable amplifier and employed to control the selective operation of a reversible motor for adjusting the bridge rebalancing contact 79 to a new position along the resistance 78 at which the bridge unbalance is reduced to zero.

Figure 8:
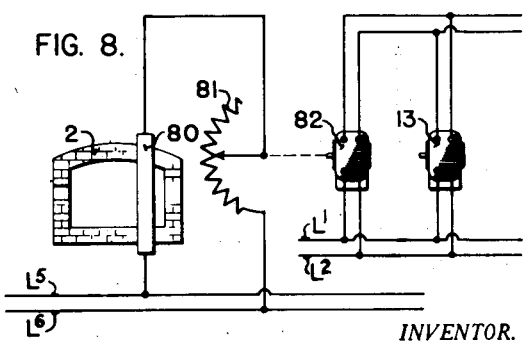
Fig. 8 is a diagrammatic view illustrating the use of the invention in a control system.

It will be apparent that motor 13 may be employed to operate a control valve or a rheostat for governing the application of an agent to a furnace for producing heat, for example, to the radiant energy of which the photoelectric cell 1 is responsive, or another motor desirably operated together with the motor 13 may be so employed. For example, as shown in Fig. 8, a furnace 2 to the radiant energy of which the photoelectric cell 1 is responsive is heated by a resistor 80 which is connected to electric supply conductors L⁵ and L⁶ through a resistor 81 the adjustment of which is effected by a motor 82. The motor 82 may be exactly like the motor 13 and in Fig. 8 is shown as having its shading field windings connected to the output terminals of amplifier 10 and in parallel with the shading field winding of the motor 13, and the main field winding is connected to the alternating current supply conductors L¹ and L². The mechanical connection of the rheostat 81 to the motor 82 is such as to increase and decrease the supply of electric current to the resistor 80 as the radiant energy to which the photoelectric cell 1 is responsive drops below or rises above a predetermined level.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. Photometric measuring apparatus comprising the combination with a balanced electrical bridge network including a light sensitive device in one arm which is responsive to changes in a variable condition and adapted to produce unbalanced electromotive forces in said electrical network in accordance with changes in said condition, electrical energizing means, a power driven physically movable device energized by said last mentioned means and adapted to rebalance said network on unbalance thereof, electrical valve means having an input circuit and an output circuit electrically controlled by the input circuit for continuously controlling the actuation of said device in accordance with the magnitude of said condition, operative connections between the output circuit of said electrical valve means and said device, and operative connections to directly control the input circuit of said electrical valve means by said unbalanced electromotive forces.

2. Photometric measuring apparatus comprising the combination with a balanced electrical bridge network having a light sensitive device in one arm which is responsive to changes in a variable condition and adapted to produce unbalanced electromotive forces in said network in accordance with changes in said condition, solely electronic discharge means for amplifying said unbalanced electromotive forces, adjustable means disposed in another arm of said network for reducing said unbalanced electromotive forces, electrical energizing means, and a power driven physically movable device energized by said last mentioned means and directly controlled by said amplifying means adapted to continuously control said adjustable means.

3. Photometric measuring apparatus comprising the combination with a balanced electrical bridge network having a photoelectric cell of the electron emissive type in one arm which is illuminated in accordance with the magnitude of a variable condition and is adapted to produce unbalanced electromotive forces in said network in accordance with changes in said condition, solely electrical means for amplifying said unbalanced electromotive forces, adjustable means disposed in another arm of said network for reducing said unbalanced electromotive forces, electrical energizing means, and a reversible electrical motor having a winding energized by said last mentioned means and a winding directly controlled by said amplifying means adapted to continuously control said adjustable means.

4. Photometric measuring apparatus comprising the combination with a balanced electrical bridge network having a light sensitive device in one arm which is responsive to changes in a variable condition and adapted to produce unbalanced electromotive forces in said network in accordance with changes in said conditions, solely electrical means for amplifying said unbalanced electromotive forces, a light sensitive device included in another arm of said network the conductivity of which is adapted to be varied for reducing said unbalanced electromotive forces, means for controlling the illumination of said second mentioned light sensitive device, electrical energizing means, and a reversible electrical motor having a winding energized by said last mentioned means and a winding directly controlled by said amplifying means adapted to continuously control said illumination controlling means.

5. Photometric measuring apparatus comprising the combination with a balanced electrical network having a light sensitive device in one arm which is responsive to changes in a variable condition and adapted to unbalance said network in accordance with changes in said condition, alternating voltage energizing means for said network, means for amplifying the unbalanced electromotive forces produced in said network as a result of changes in said variable condition, adjustable means included in another arm of said network adapted to be varied for reducing said unbalanced electromotive forces, and a device jointly energized by said alternating voltage source and the current in the output circuit of said amplifying means adapted to continuously control said adjustable means.

6. Photometric measuring apparatus comprising the combination with a balanced electrical bridge network having a light sensitive device in one arm which is responsive to changes in a variable condition and adapted to unbalance said network in accordance with changes in said condition, alternating voltage energizing means for said network, means for amplifying the unbalanced electromotive forces produced in said network as a result of changes in said variable condition, adjustable means included in another arm of said network adapted to be varied for reducing said unbalanced electromotive forces, and a reversible electrical motor jointly energized by said alternating voltage source and the current in the output circuit of said amplifying means adapted to continuously control said adjustable means.

7. Photometric measuring apparatus comprising the combination with a balanced electrical bridge network having a light sensitive device in one arm which is responsive to changes in a variable condition and adapted to unbalance said network in accordance with changes in said condition, alternating voltage energizing means for said network, means for amplifying the unbalanced electromotive forces produced in said network as a result of changes in said variable condition, a light sensitive device included in another arm of said network the conductivity of which is adapted to be varied for reducing said unbalanced electromotive forces, means for controlling the illumination of said second mentioned light sensitive device, and a reversible electrical motor jointly energized by said alternating voltage source and the current in the output circuit of said amplifying means adapted to continuously control said illumination controlling means.

8. Photometric measuring apparatus comprising the combination with a balanced electrical bridge network having a light sensitive device in one arm which is responsive to changes in a variable condition and adapted to unbalance said network in accordance with changes in said condition, a second light sensitive device included in an opposed arm of said network the conductivity of which is adapted to be varied for reducing said network unbalance, a transformer having a primary winding and a secondary winding, one half of said primary winding being connected in a third bridge network arm and the other half of said primary winding being connected in the remaining bridge network arm, alternating voltage energizing means for said bridge network, amplifying means, a connection between said transformer secondary winding and the input circuit of said amplifying means, means for controlling the illumination of said second mentioned light sensitive device, and a reversible electrical motor jointly energized by said alternating voltage source and the current in the output circuit of said amplifying means adapted to continuously control said illumination controlling means.

9. Photometric measuring apparatus comprising the combination with a balanced electrical bridge network having a light sensitive device in one arm which is responsive to changes in a variable condition and adapted to produce unbalanced direct current electromotive forces in said network in accordance with changes in said condition, physically stationary means for transforming said unbalanced direct current electromotive forces into corresponding alternating electromotive forces, means for amplifying said alternating electromotive forces, adjustable means including a light sensitive device connected in another arm of said network adapted to be controlled for reducing said unbalanced electromotive forces, an alternating voltage energizing source, and a reversible induction motor having a winding permanently connected to and energized by said alternating voltage source and a winding permanently connected to and energized by the output current of said amplifying means adapted to control said adjustable means.

10. Photometric measuring apparatus comprising the combination with a balanced electrical bridge network having a light sensitive device in one arm which is responsive to changes in a variable condition and adapted to unbalance said network in accordance with changes in said condition, direct current energizing means for said network, means for transforming the direct current unbalanced electromotive forces produced in said network as a result of changes in said variable condition into corresponding alternating electromotive forces including a light sensitive device through which said direct current is passed and a source of pulsating light for illuminating said light sensitive device, means for amplifying said alternating electromotive forces, a light sensitive device included in another arm of said network the conductivity of which is adapted to be varied for reducing said unbalanced electromotive forces, a lamp for illuminating said last mentioned light sensitive device, energizing means for said lamp and a device controlled by the output current of said amplifier adapted to control said energizing means.

11. Photometric measuring apparatus comprising the combination with a balanced electrical bridge network having a light sensitive device in one arm which is responsive to changes in a variable condition and adapted to unbalance said network in accordance with changes in said condition, direct current energizing means for said network, physically stationary means for transforming the direct current unbalanced electromotive forces produced in said network as a result of changes in said variable condition into corresponding alternating electromotive forces, means for amplifying said alternating electromotive forces, adjustable means included in another arm of said network adapted to be varied for reducing said unbalanced elec- tromotive forces, an alternating voltage energizing source, and a reversible electrical rotating field motor having a winding permanently connected to and energized by said alternating voltage source and a winding permanently connected to and energized by the output current of said amplifying means adapted to control said adjustable means.

12. Photometric measuring apparatus comprising the combination with a balanced electrical bridge network having a light sensitive device in one arm which is responsive to changes in a variable condition and adapted to produce unbalanced electromotive forces in said network in accordance with changes in said condition, a slidewire resistor included in another arm of said network adapted to be varied for reducing said unbalanced electromotive forces, a reversible electrical motor adapted to continuously control said slidewire resistor, electrical valve means having an input circuit and an output circuit controlled by the input circuit, operative connections between the output circuit of said electrical valve means and said motor, and operative connections to directly control the input circuit of said electrical valve means by said unbalanced electromotive forces.

13. Photometric measuring apparatus comprising the combination with a balanced electrical bridge network having a light sensitive device in one arm which is responsive to changes in a variable condition and adapted to unbalance said network in accordance with changes in said condition, alternating voltage energizing means for said network, means for amplifying the unbalanced electromotive forces produced in said network as a result of changes in said variable condition, fluctuating light means energized from said alternating voltage source and adapted to be illuminated only during one-half of each cycle of said alternating voltage source, a light sensitive device included in an opposing arm of said network adapted to be illuminated by said fluctuating light means, a slidewire resistor included in another arm of said network adapted to be varied for reducing said unbalanced electromotive forces, and a reversible electrical motor directly controlled by the output current of said amplifying means adapted to continuously control said slidewire resistor.

14. Photometric measuring apparatus comprising the combination with a balanced electrical network having a photoelectric cell in one arm which is responsive to changes in a variable condition and adapted to unbalance said network in accordance with changes in said condition, a source of fluctuating voltage, means to energize said network from said fluctuating voltage source, means for amplifying the unbalanced electromotive forces produced in said network as a result of changes in said variable condition, adjustable means included in another arm of said network adapted to be varied for reducing said unbalanced electromotive forces, and a device jointly energized by said fluctuating voltage source and the current in the output circuit of said amplifying means adapted to continuously control said adjustable means.

HENRY M. SCHMITT.